United States Patent
Iruvanti et al.

(10) Patent No.: US 9,045,674 B2
(45) Date of Patent: Jun. 2, 2015

(54) HIGH THERMAL CONDUCTANCE THERMAL INTERFACE MATERIALS BASED ON NANOSTRUCTURED METALLIC NETWORK-POLYMER COMPOSITES

(75) Inventors: Sushumna Iruvanti, Wappingers Falls, NY (US); Theodorian Borca-Tasciuc, Troy, NY (US); Hafez Raeisi-Fard, Troy, NY (US); Fengyuan Lai, Troy, NY (US); Kamyar Pashayi, Troy, NY (US); Joel Plawsky, Albany, NY (US)

(73) Assignee: International Business Machines Corporation, Armonk, NY (US)

(*) Notice: Subject to any disclaimer, the term of this patent is extended or adjusted under 35 U.S.C. 154(b) by 207 days.

(21) Appl. No.: 13/357,190

(22) Filed: Jan. 24, 2012

(65) Prior Publication Data
US 2012/0187332 A1 Jul. 26, 2012

Related U.S. Application Data

(60) Provisional application No. 61/435,854, filed on Jan. 25, 2011.

(51) Int. Cl.
*C09K 5/06* (2006.01)
*C09K 5/14* (2006.01)
*B82Y 30/00* (2011.01)

(52) U.S. Cl.
CPC . *C09K 5/14* (2013.01); *B82Y 30/00* (2013.01); *C09K 5/063* (2013.01)

(58) Field of Classification Search
CPC .................................. B82Y 30/00; C09K 5/14
USPC ........................................................ 524/133
See application file for complete search history.

(56) References Cited

U.S. PATENT DOCUMENTS

| | | | |
|---|---|---|---|
| 2003/0153667 A1* | 8/2003 | Jayaraman et al. | 524/432 |
| 2005/0045855 A1* | 3/2005 | Tonapi et al. | 252/500 |
| 2011/0278058 A1* | 11/2011 | Sundararaj et al. | 174/520 |

OTHER PUBLICATIONS

Prasher, R., "Thermal Conductivity of Composites of Aligned Nanoscale and Microscale Wires and Pores" Journal of Applied Physics (Aug. 1, 2006) pp. 034307-1-034307-9, vol. 100.

Hamdan, A. et al., "Evaluation of a Thermal Interface Material Fabricated Using Thermocompression Bonding of Carbon Nanotube Turf" Nanotechnology (Jan. 8, 2010) pp. 1-8, vol. 21.

Yu, A. et al., "Graphite Nanoplatelet-Epoxy Composite Thermal Interface Materials" The Journal of Physical Chemistry C (May 2007) pp. 7565-7569, vol. 1111.

Agarwal, S. et al., "Thermal Conductivity of Polymer Nanocomposites Made with Carbon Nanofibers" Polymer Engineering and Science (Dec. 1, 2008) pp. 2474-2481, vol. 48, No. 12.

Zhang, Z. et al., "Pressure-Assisted Low-Temperature Sintering of Silver Paste as an Alternative Die-Attach Solution to Solder Reflow" IEEE Transactions on Electronics Packaging Manufacturing (Oct. 2002) pp. 279-283, vol. 25, No. 4.

Xu, J. et al., "Silver Nanowire Array-Polymer Composite as Thermal Interface Material" Journal of Applied Physics (Dec. 22, 2009) pp. 124310-1-124310-7, vol. 106.

* cited by examiner

*Primary Examiner* — Doris Lee
(74) *Attorney, Agent, or Firm* — Scully, Scott, Murphy & Presser, P.C.; Joseph Petrokaltis, Esq.

(57) ABSTRACT

A composite structure provides high thermal conductivity as a thermal interface structure with a relatively low filler loading. The composite structure is formed by dispersing nanoparticles in a matrix at a low filler loading, and controlled sintering of the composite structure to induce agglomeration of the nanoparticles into a connected percolating thermally conducting network structure within the matrix.

19 Claims, 17 Drawing Sheets

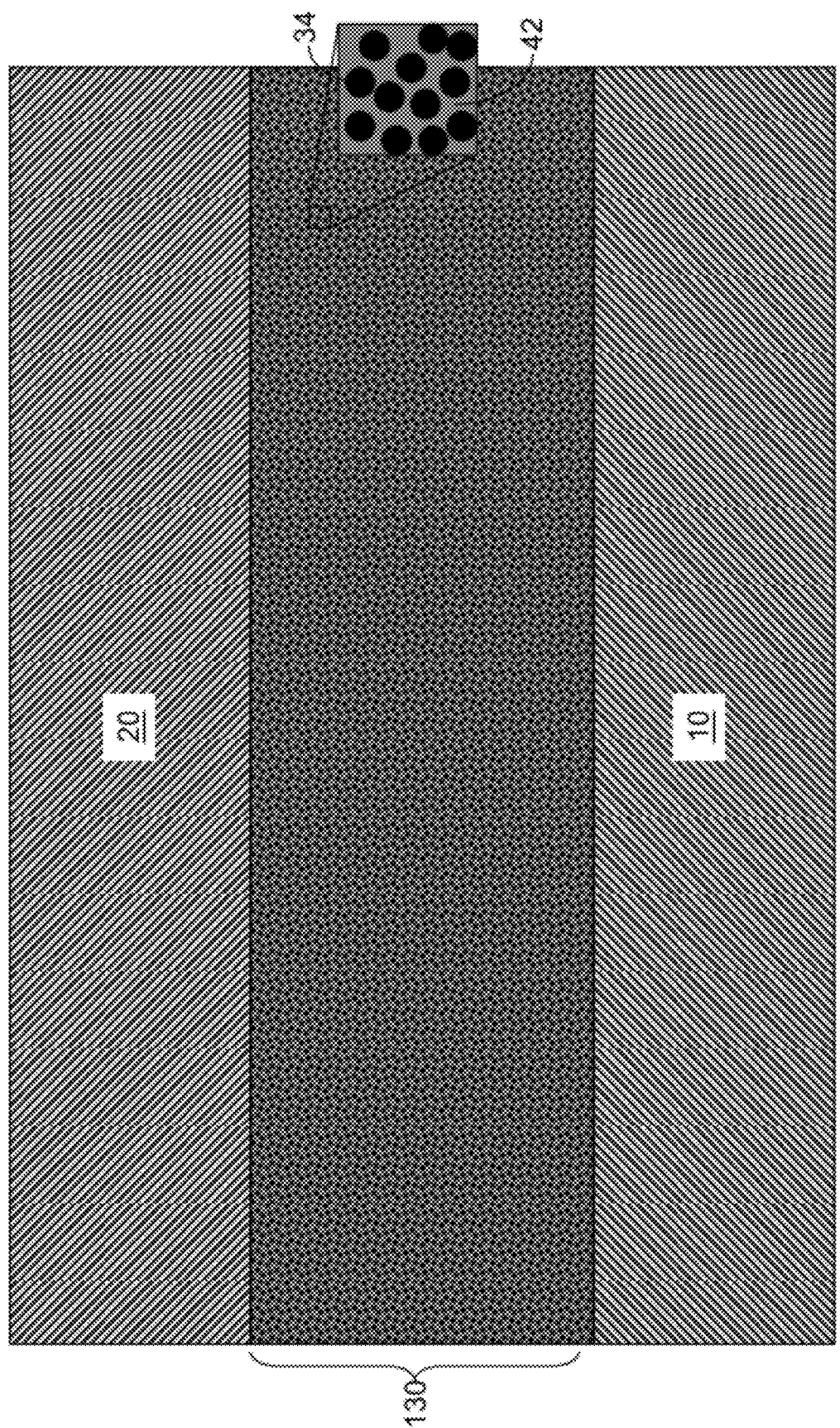

HIGH THERMAL CONDUCTANCE THERMAL INTERFACE MATERIALS BASED ON NANOSTRUCTURED METALLIC NETWORK-POLYMER COMPOSITES

CLAIM OF PRIORITY

This application is based on, and claims the benefit of priority from, U.S. Provisional Patent Application 61/435,854 filed on Jan. 25, 2011.

BACKGROUND

The present disclosure relates to a high thermal conductivity composite structure, and specifically to a composite structure having a connected percolating thermally conducting network structure comprising a thermal interface material (TIM), and methods of manufacturing the same.

Thermal interface material (TIM) is a material used to minimize the contact thermal resistance between surfaces and provides a low resistance path to spread and remove heat. Examples of TIM known in the art employ randomly distributed filler materials dispersed in a matrix. Each of the randomly distributed filler materials has a characteristic dimension (such as a diameter) on the order of several microns or greater.

In such conventional dispersed systems, the filler loading needs to be at least 50~60% in order to achieve a high thermal conductivity for the composite structure. The associated increase in stiffness, i.e., an increase in the viscosity or compressibility, introduces challenges in manufacturing processes (dispense and handling) and product applications (stresses on fragile components, or accommodating stack-up tolerances). Highly filled conventional TIMs require further process or design improvements to overcome such drawbacks. There is, therefore, a need for thermal interface materials with high thermal conductivity without the drawbacks associated with the high filler loading of conventional high thermal conductivity TIMs.

Typically, the thermal conductivities of matrix materials are much lower than the thermal conductivities of conductive filler materials dispersed therein. A significant level of filler loading, i.e., the volume percentage of the filler material as a fraction of the entire volume of a composite structure including the filler material and the matrix, e.g., 50%-60%, is needed to provide a thermal conductivity that is effective in removing heat. Decreasing the particle size typically results in reduction of the conductivity of the composite structure. While increasing the particle size above 10 microns can increase the conductivity of the composite structure, such large particles and/or increased filler loadings result in dilatant behavior in grease type TIMs and/or an increase in the Bond Line Thickness (BLT) of the composite structure, and therefore, an undesirable increase in thermal resistance, i.e., an undesirable decrease in thermal conductance of the composite structure.

Fast and efficient exchange and storage of thermal energy plays a vital role in a wide range of thermal management applications ranging from buildings and solar power plants to computer chips. Efficient solutions for thermal energy storage and exchange in buildings (one of the largest energy consumers) are needed to enable heat absorption during the times when thermal energy is abundant (and therefore cooling the environment) while releasing the heat during the times when room temperature drops below the setpoint conditions. This approach can lead to smaller temperature variations and reductions in the energy consumption allocated for heating and cooling.

The same general idea leads to better efficiencies in large scale applications such as solar-thermal power plants, and other thermal energy harvesting applications where the power cycle is intermittent, or there is a significant time lapse between the power generation peak and consumer peak use. Phase change materials (PCM) can absorb and release large amounts of thermal energy at relatively constant temperature and pressure. PCMs can be employed in fields such as spacecraft thermal systems, softening of exothermic temperature peaks in chemical reactions, thermal comfort in vehicles, cooling of engines (electric and combustion), medical applications (transport of blood under stable temperature, operating tables, hot-cold therapies), thermal protection of electronic devices (as a passive patch integrated in the appliance), safety (temperature maintenance in rooms with computers or electrical appliances), and thermal storage of solar energy.

One type of phase change mechanisms is the liquid-solid transition. PCMs include three categories of materials. A first category of PCMs include organic PCMs such as paraffin $(C_nH2_{n+2})$ and fatty acids $(CH_3(CH_2)_{2n}COOH)_2$. A second category of PCMs include inorganic PCMs, which include salt hydrates $(M_nH_2O)$. A third category of PCMs include eutectics, which can be a eutectic of at least two organic PCMs, a eutectic of at least two inorganic PCMs, or a eutectic of at least one organic PCM and at least one inorganic PCM.

Commercial paraffin waxes (not pure) are cheap and have moderate thermal storage densities (~200 kJ/kg or 150 MJ/m$^3$) and a wide range of melting temperatures (20° C.~70° C.). Such waxes undergo negligible sub-cooling (the temperature below saturation to initiate the solidification process) and are chemically inert and stable. Fatty acids (such as capric, lauric, palmitic and stearic acids) and their binary mixtures melt between 30° C. to 65° C., while their latent heat of transition was observed to vary from 153 to 182 kJ/kg. Hydrated salts are attractive materials for use in thermal energy storage due to higher volumetric storage density (~350 MJ/m$^3$), and moderate costs compared to paraffin waxes. One of the most important examples of eutectics phase change materials are encapsulated PCMs. Encapsulated PCMs are composed of a protective shell and one or more active materials as the core substance. The protective shell is either natural or synthetic polymer while the active ingredient is mostly a solid.

Thermophysical properties of phase change materials are known in the art. A vital problem of all PCM based thermal energy storage systems is the low thermal conductivity (κ) of the PCM, which restricts the heat transfer rate as well as the fast access to the thermal energy stored away from the heat transfer surfaces. The thermal conductivity of PCM materials is typically much lower than 1 W/mK. In addition, most available commercial PCMs are corrosive to most metals and suffer from decomposition, high changes in volume during phase change, and flammability that can affect phase change properties. These disadvantages keep conventional PCMs from large scale implementations.

At much smaller scales, a similar need for high κ and high heat capacity materials is encountered in the thermal management of electronics and optoelectronic devices. Stable and low operating temperatures are desired for device performance. To improve the heat transfer from the hot side to the heat sink, a critical role is played by thermal interface materials (TIM) used to minimize the contact thermal resistance between surfaces and provide a low resistance path to spread and remove heat. Thermal interface materials known in the art employ microparticles dispersed in a matrix, and include thermal greases, thermal gels, phase change materials, and thermally conductive adhesives based on a matrix and highly conductive fillers such as graphite, carbon nanotubes, silicon carbide, boron nitride, aluminum nitride and aluminum oxide.

The filler loading is high, and is typically greater than 50 volume percent in such TIMs in order to achieve a high composite (effective) thermal conductivity. The associated increase in viscosity or stiffness/compressibility introduces challenges in manufacturing processes (dispense and handling) and product applications (stresses on fragile components or accommodating stackup tolerances). Highly filled conventional TIMs require further process or design improvements to overcome these drawbacks. Thermal greases filled with aluminum, alumina and silver powders have a κ in the range of 2.89 W/mK to 7.5 W/mK. Thermal greases are limited by pump-out resulting from an expansion and contraction at the thermal interfaces. This pumping effect can push the material away from the interface and cause a hot spot. Tin solder joints, consisting of metallic elements, may reach a κ of about 43 W/mK. Poor wetting of the surface, low yield strength and melting point and environmental health concern and package stresses make solder systems an inconvenient material for TIM. Thermal conductivities of 20~86 W/mK can be achieved with elemental phase change materials such as indium and gallium. These also require complex processing and structure modifications to address adhesion, containment and package stress considerations. Usage of liquid metals between the mating surfaces may also cause corrosion damage. Thermal conductivities of 80 W/mK were reported for a thermally conductive silver paste under the high pressure, high temperature (~300° C.) sintering process. However the high sintering temperature (~300° C.) of the commercial silver pastes makes such pastes an impractical thermal interface material. Therefore there is a need for thermal interface materials with high κ without the drawbacks associated with the high filler loading of conventional high thermal conductivity TIMs. For systems where high power levels are switched to help with overall efficiency, TIMs will need to have high effective κ and high effective heat capacities to minimize thermal transients and their mechanical consequences.

BRIEF SUMMARY

A composite structure provides high thermal conductivity with a relatively low filler loading and viscosity. The composite structure is formed by dispersing nanoparticles in a matrix at a low filler loading, and controlled sintering of the composite structure to induce agglomeration of the nanoparticles into a connected percolating thermally conducting network structure within the matrix.

The nanoparticles can be coated to promote wetting and dispersion of the nanoparticles in the matrix. The coating can be removed at relatively low temperatures before sintering and matrix curing occurs. The melting temperature of the nanoparticles is reduced due to small size, thereby enabling a low temperature sintering. An interconnected, high-thermal-conductivity network is formed inside the matrix during the sintering process.

According to an aspect of the present disclosure, a composite structure includes a matrix and a connected percolating thermally conducting network structure embedded within the matrix, the connected percolating metallic network including interconnected thermally conducting pathways.

According to another aspect of the present disclosure, a method of forming a compound is provided. The method includes: dispersing metallic nanoparticles in a matrix; and forming a connected percolating thermally conducting network structure embedded within the matrix by inducing agglomeration of the metallic nanoparticles into interconnected thermally conducting pathways.

BRIEF DESCRIPTION OF THE SEVERAL VIEWS OF THE DRAWINGS

FIG. 3A is a vertical cross-sectional view of a first exemplary structure including a stack of a first substrate, a composite structure of metallic nanoparticles dispersed in a phase change material matrix, and a second substrate according to a second embodiment of the present disclosure.

DETAILED DESCRIPTION

Figure 1A:
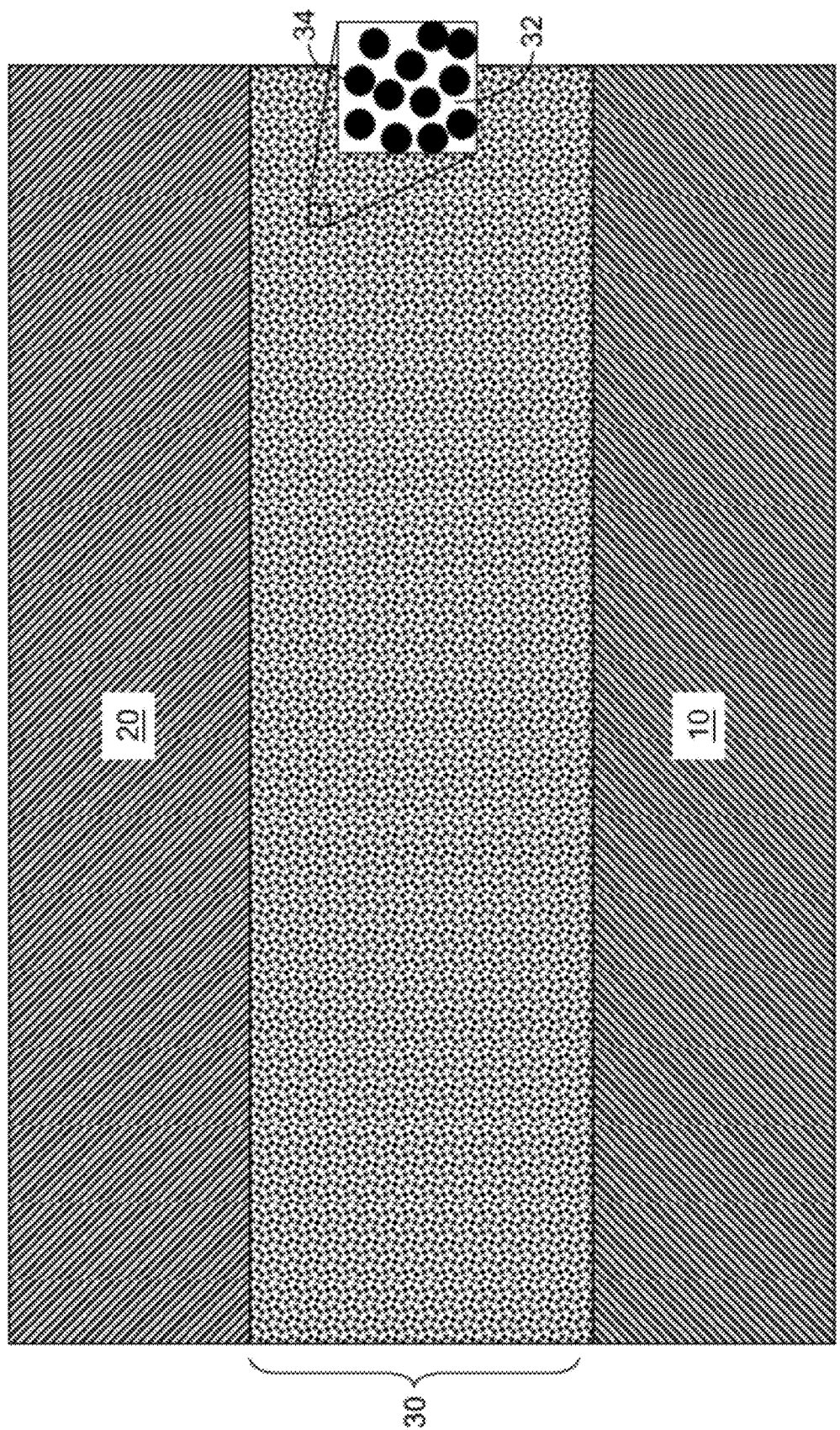
FIG. 1A is a vertical cross-sectional view of a first exemplary structure including a stack of a first substrate, a composite structure of metallic nanoparticles dispersed in a matrix, and a second substrate according to a first embodiment of the present disclosure.

As stated above, the present disclosure relates to a thermal interface material (TIM) and comprises a composite structure having a connected percolating thermally conducting network structure, and methods of manufacturing the same, which are now described in detail with accompanying figures. Like and corresponding elements mentioned herein and illustrated in the drawings are referred to by like reference numerals. The drawings are not necessarily drawn to scale.

As used herein, "high thermal conductivity" refers to thermal conductivity greater than 1 W/mK.

As used herein, a "high thermal conductivity network" refers to a network structure having thermal conductivity, i.e., thermal conductivity greater than 1 W/mK.

As used herein, "low filler loading" refers to filler loading less than 30 volume percentage.

A thermal interface material (TIM) is a material used to minimize the contact thermal resistance between surfaces and to provide a low resistance path to spreading and removing heat. According to an embodiment of the present disclosure, a composite structure including a highly connected, percolated metallic network in a polymer matrix is employed as a TIM. As used herein, an element is percolated if the individual particles contact to form interconnected networks for electrical conduction/shorting or thermal conduction. The metallic network is formed after dispersion of metallic nanoparticles in the matrix and before the polymer is cured.

As used herein, a "nanoparticle" is a particle having a maximum dimension greater than, or equal to, 1.0 nm, and less than 1.0 micron, in any direction. In one embodiment, a nanoparticle can have a maximum dimension between 5 nm and 500 nm in any direction. In one embodiment, a nanoparticle can have a maximum dimension less than 300 nm in any direction. In one embodiment, a nanoparticle can have a maximum dimension less than 100 nm in any direction. In one embodiment, a nanoparticle can have a maximum dimension greater than 3 nm in any direction. In one embodiment, a nanoparticle can have a maximum dimension greater than 10 nm in any direction.

As used herein, a "microparticle" is a particle having a maximum dimension greater than, or equal to, 1.0 micron, and less than 1.0 mm, in any direction. In one embodiment, a microparticle can have a maximum dimension less than 300 microns in any direction. In one embodiment, a microparticle can have a maximum dimension less than 100 microns in any direction. In one embodiment, a microparticle can have a maximum dimension greater than 3 microns in any direction.

In one embodiment, a microparticle can have a maximum dimension greater than 10 microns in any direction.

During the course of experiments leading to the present disclosure, the thermal conductivity of the epoxy, filled with 20 nm, 80 nm, 1.8 μm and 4.2 μm diameter silver particles, was investigated. It was found that at the same volume fraction the nanoparticle-based composites have more than an order of magnitude higher thermal conductivity than the microparticle-based composites.

The highest thermal conductivity was observed for the composite structure derived from 20 nm diameter silver nanoparticle materials. For these materials, the thermal conductivity ranged from 0.185 W/mK to 19.25 W/mK when the silver nanoparticle volume fraction was gradually increased from 0% to 20%. The Maxwell-Garnett-type effective medium approach (EMA) and the Maxwell-Eucken model predictions agreed well with the experimental data for thermal conductivities of nanoparticle and microparticle composites respectively. SEM pictures of polymer nanocomposites proved that morphological changes induced by the sintering of silver nanoparticles construct a network between nanoparticles in the epoxy matrix, increasing the nanocomposite thermal conductivity.

In one embodiment of the present disclosure, conductive nanoparticles can be employed as a filler material in a matrix to form a high thermal conductivity composite structure. For example, the conductive nanoparticles can be silver nanoparticles, copper nanoparticles, aluminum nanoparticles, any other metallic nanoparticles including a single elemental metal, a combination of at least two elemental metals, or nanoparticles of any other thermally and electrically conductive non-metallic material, or thermally conductive and electrically insulative material, such as doped semiconductor materials, metal carbides, oxides and nitrides. In one embodiment, the matrix can include a polymer such as an epoxy, modified epoxy, modified epoxy, silicone, rubber, or any other synthetic or natural polymeric material.

A nanoparticle-polymer composite can be fabricated according to the following steps. First a polymer, such as an epoxy resin, and a curing agent are intermixed. Conventional epoxy resins can be used. Exemplary epoxy resins include, but are not limited to, DGEBA (diglycidyl ether bisphenol A), TGAP, novolac, polyurethanes, and commericial materials such as Master Bond EP65HT-1 EPL 112. Similarly, conventional anhydride and amine curing agents can be used. Exemplary curing agents include but are not limited to, triethylenetetramine, isophorone-diamine, cyclohexylamine, and bis(p-aminocyclohexylmethane), or anhydride such as phthalic anhydride. For example, the weight ratio between the polymer and the curing agent can be from 0.1 to 10. In one embodiment, the weight ration can be from 0.3 to 3. In one embodiment, the weight ratio can be about 1.

Subsequently, metallic nanoparticles are added to the mixture of the polymer and the curing agent. The volume fraction of the metallic nanoparticles in the mixture of the polymer, the curing agent, and the metallic particles is greater than 0%, and can be less than 80%. In one embodiment, the volume fraction of the metallic nanoparticles in the mixture of the polymer, the curing agent, and the metallic particles can be less than 50%. In another embodiment, the volume fraction of the metallic nanoparticles in the mixture of the polymer, the curing agent, and the metallic particles can be less than 20%. In yet another embodiment, the volume fraction of the metallic nanoparticles in the mixture of the polymer, the curing agent, and the metallic particles can be less than 15%. In even another embodiment, the volume fraction of the metallic nanoparticles in the mixture of the polymer, the curing agent, and the metallic particles can be less than 10%. In still another embodiment, the volume fraction of the metallic nanoparticles in the mixture of the polymer, the curing agent, and the metallic particles can be less than 5%. In a further embodiment, the volume fraction of the metallic nanoparticles in the mixture of the polymer, the curing agent, and the metallic particles can be greater than 1%. In further another embodiment, the volume fraction of the metallic nanoparticles in the mixture of the polymer, the curing agent, and the metallic particles can be greater than 5%. In even further another embodiment, the volume fraction of the metallic nanoparticles in the mixture of the polymer, the curing agent, and the metallic particles can be greater than 10%. In yet further another embodiment, the volume fraction of the metallic nanoparticles in the mixture of the polymer, the curing agent, and the metallic particles can be greater than 15%. In still further another embodiment, the volume fraction of the metallic nanoparticles in the mixture of the polymer, the curing agent, and the metallic particles can be greater than 30%.

A homogeneous slurry of the polymer, the curing agent, and the metallic particles plus any minor additives-adhesion promoter, catalyst/accelerator, cure inhibitor, etc., is subsequently obtained by inducing thorough intermixing of the components of the mixture. For example, an ultrasonic cell disrupter can be employed to break up any clusters of the nanoparticles, thereby forming a homogeneous slurry having uniformly dispersed metallic nanoparticles therein. The homogeneous slurry is herein referred to as a nanocomposite material.

In one embodiment, collateral heating of the homogeneous slurry can be avoided by cooling a container including the nanocomposite material while sonicating to keep the temperature of the nanocomposite material at room temperature. As used herein, "room temperature" refers to a temperature range from 10° C. to 35° C. The homogeneous slurry can be de-aired in a vacuum chamber.

The homogeneous slurry of the polymer, the curing agent, and the metallic particles is subsequently poured into a mold or upon another structure such as a substrate. In one embodiment, the mold can be a silicone rubber mold. In another embodiment, a stack of a first substrate 10 and a composite structure 30 of metallic nanoparticles 34 dispersed in a matrix 32 containing the polymer and the curing agent (without a second substrate) can be formed as illustrated in FIG. 1A. In yet another embodiment, a stack of a first substrate 10, a composite structure 30 of metallic nanoparticles 34 dispersed in a matrix 32 containing the polymer and the curing agent, and a second substrate 20 can be formed as illustrated in FIG. 1A.

In one embodiment, the first substrate 10 and/or the second substrate 20 can independently be a semiconductor chip, a packaging substrate, a printed circuit board (PCB), a heat spreader, or a transposer/interposer structure as known in semiconductor industry.

The homogeneous slurry, i.e., the composite structure 30 in a mold or in contact with at least one substrate (10, 20) is subsequently cured at an elevated temperature, i.e., a temperature greater than room temperature. The elevated temperature can be in a range from 30° C. to 250° C. In one embodiment, the homogeneous slurry is cured in an oven at a temperature greater than 50° C. In another embodiment, the homogeneous slurry is cured in an oven at a temperature greater than 100° C. In yet another embodiment, the homogeneous slurry is cured in an oven at a temperature greater than 125° C. In still another embodiment, the homogeneous slurry is cured in an oven at a temperature greater than 150° C.

In even another embodiment, the homogeneous slurry is cured in an oven at a temperature less than 275° C. In further another embodiment, the homogeneous slurry is cured in an oven at a temperature less than 200° C. In yet further another embodiment, the homogeneous slurry is cured in an oven at a temperature less than 175° C. In still further another embodiment, the homogeneous slurry is cured in an oven at a temperature less than 150° C.

The ambient during the cure can be air or an inert gas, which can be, for example, argon or nitrogen. The duration of the cure can be from 5 minutes to 24 hours. In one embodiment, the duration of the cure can be from 30 minutes to 2 hours.

Figure 1B:
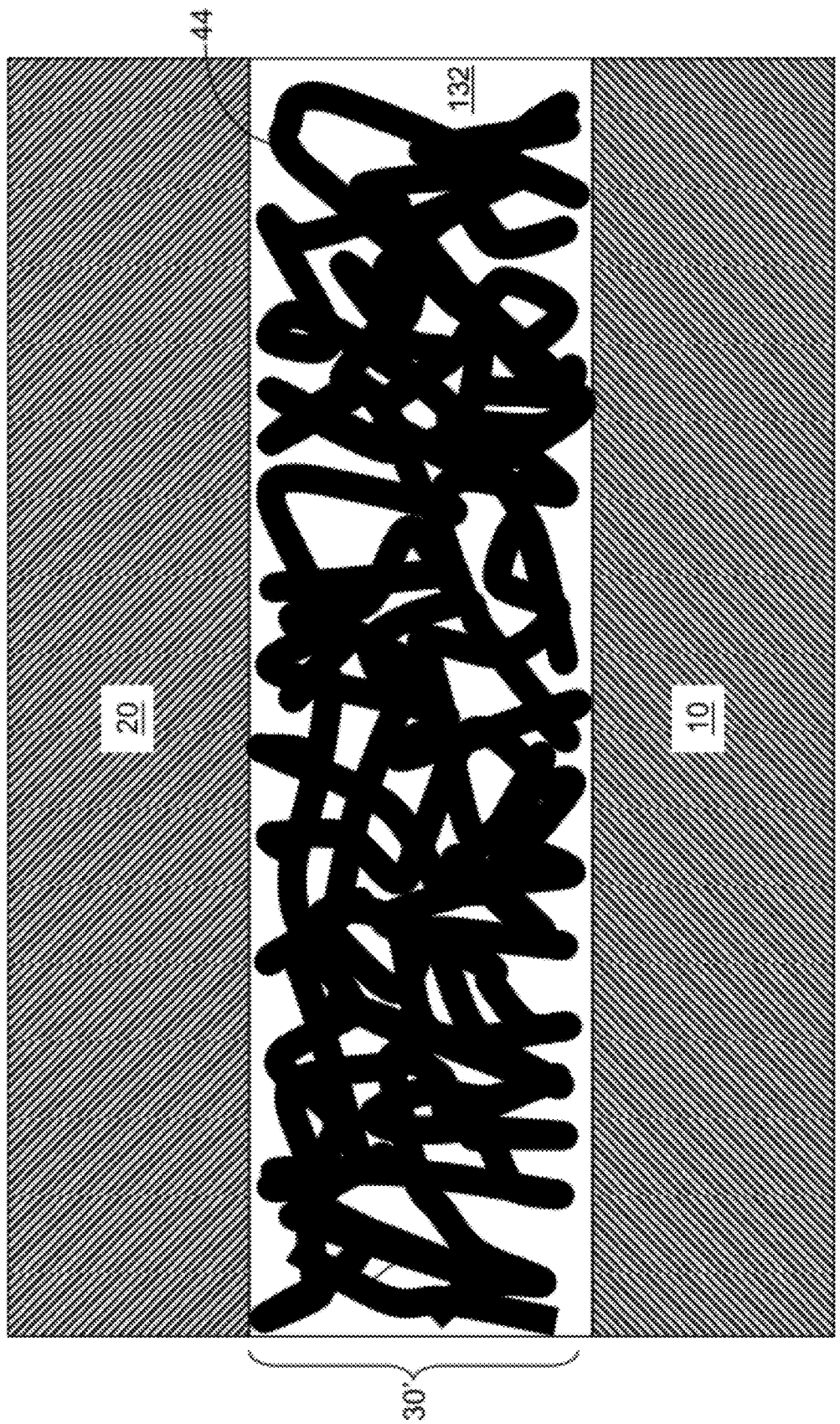
FIG. 1B is a vertical cross-sectional view of the first exemplary structure after inducing interconnection/sintering of the metallic nanoparticles to form a connected percolating thermally conducting network structure embedded within the matrix according to the first embodiment of the present disclosure.

A resulting composite structure 30' after the cure includes a connected percolating thermally conducting network structure 44 as illustrated in FIG. 1B. In one embodiment, the connected percolating thermally conducting network structure can be a connected percolating electrically conducting network structure. In another embodiment, the connected percolating thermally conducting network structure can be an electrically insulating network structure. In this case, nanoparticles that are thermally conductive and electrically insulating can be sintered into thermally conducting and electrically insulating pathways. The connected percolating conducting network structure 44 is embedded within a polymeric matrix 132, which is the remaining portion of the mixture of the polymer and the curing agent.

According to measurements performed on various samples of the composite structure obtained by curing a matrix containing 20 nm silver nanoparticles at a volume fraction of 20%, the composite thermal conductivity is 19.25 W/mK, which is several times higher than any silver-containing composite structure having the same volume fraction of silver microparticles embedded in a polymer matrix as known in the art.

In addition, the measured thermal conductivity of the composite structure obtained by annealing a matrix containing 20 nm silver nanoparticles at a volume fraction of 20% is approximately two orders of magnitude higher than any composite structure including microscale dispersed silver nanoparticles in the same matrix and at the same volume concentration.

Figure 2B:
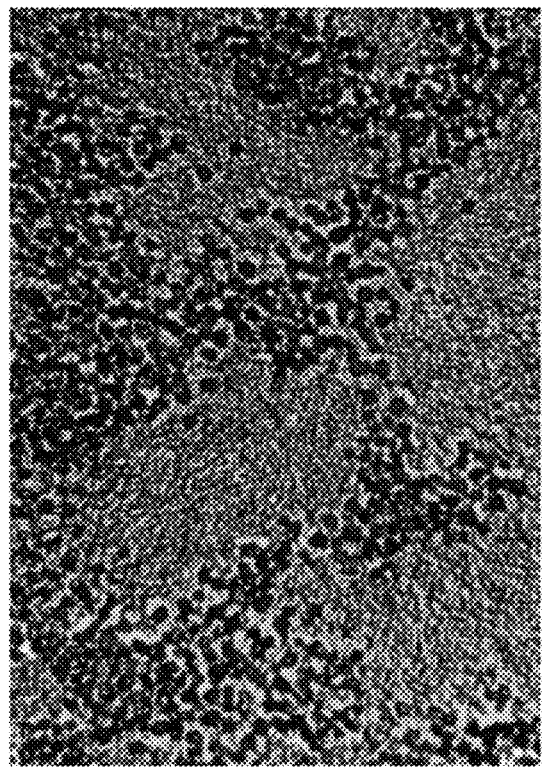
FIG. 2B is a transmission electron micrograph (TEM) of the composite structure of FIG. 2A before removing epoxy.
Figure 2A:
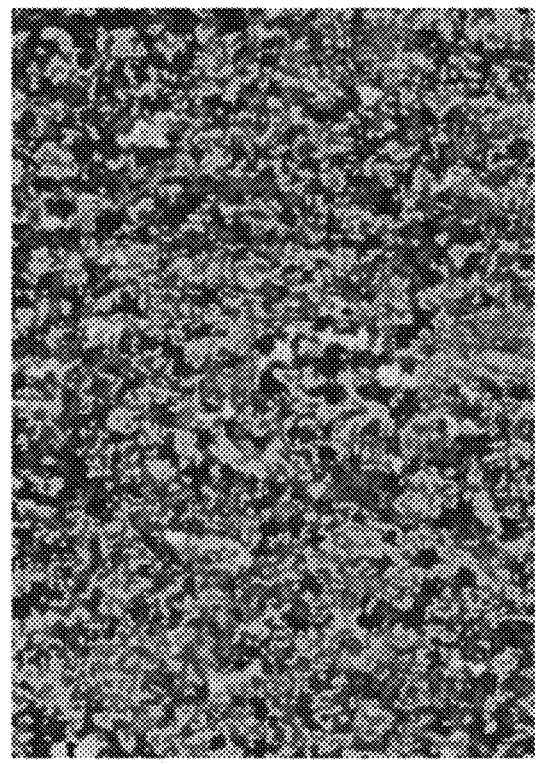
FIG. 2A is a scanning electron micrograph (SEM) of a composite structure including a connected percolating thermally conducting network structure before removing epoxy.

Referring to FIG. 2A, a scanning electron micrograph (SEM) of an exemplary composite structure 30' is shown before removing epoxy, which is the polymeric matrix 132 of FIG. 1B. The darker regions of the SEM correspond to a connected percolating thermally conducting network structure. The exemplary composite structure 30' was formed by annealing a mixture of 20 volume percent of 20 nm size silver nanoparticles and 80 volume percent of an epoxy-curing agent mixture.

Referring to FIG. 2B, a transmission electron micrograph (TEM) of the composite structure 30' of FIG. 2A (before removing epoxy) illustrates a connected percolating conducting network structure including interconnected thermally conducting pathways. Each interconnected thermally conducting pathway includes metallic nanoparticles in contact among one another (shown as darker regions in FIG. 2B) forming an interconnected conducting network structures. The nanoparticles forming the interconnected structure may range in size from 5 nm to 500 nm. The connected percolating thermally conducting network structure is embedded in a polymeric matrix (shown as lighter regions in FIG. 2B).

Figure 2C:
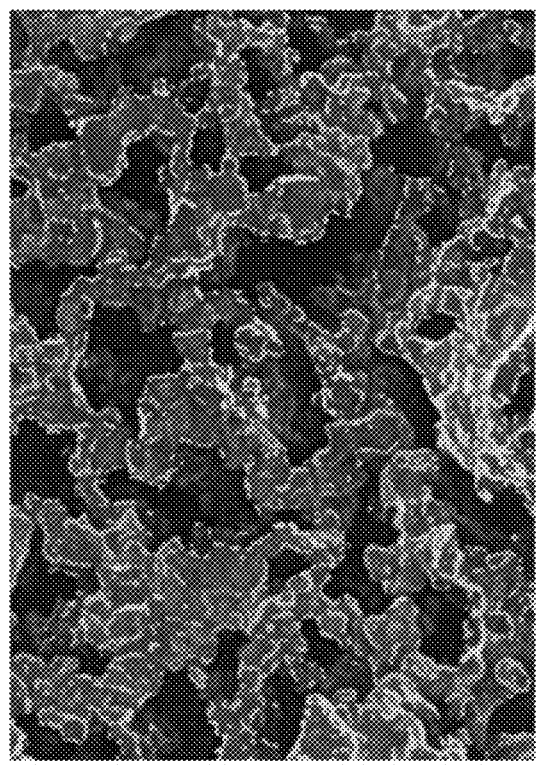
FIG. 2C is a scanning electron micrograph (SEM) of a connected percolating metallic network derived from the composite structure of FIG. 2A by partially removing the matrix.

FIG. 2C is another scanning electron micrograph (SEM), which shows the macroscopic configuration of the connected percolating metallic network after removal of a polymeric matrix from the sample of FIG. 2A. The SEM of FIG. 2C shows the connected percolating thermally conducting network structure as lighter regions, and interconnected cavities as darker regions.

In a second embodiment of the present disclosure, the first exemplary structure of FIGS. 1A and 1B can be modified so that the matrix includes a phase change material. Such structures can be useful for applications for switched power systems, which require not only high thermal conductivity but also high heat capacity to work efficiently. High thermal conductivity and high heat capacity can be provided simultaneously in a second exemplary structure of the present disclosure derived by this method.

Specifically, to increase the effective heat capacity, high thermal conductivity material in the form of metallic nanoparticles is combined with a matrix material including a phase change material (PCM). Storing and releasing the energy via phase change can act to increase the effective heat capacity of the system. The high thermal conductivity network helps even distribution of the heat to the phase change material.

A homogeneous slurry of a phase change material, a curing agent, and metallic nanoparticles is subsequently obtained by inducing thorough intermixing of the components of the mixture as in the first embodiment. The phase change material can be a polymeric solid-solid phase change material. Exemplary phase change polymers that can be employed in the second embodiment include, but are not limited to, Chromerics T725™, Thermagon T-pcn 905c™, Bergquist HiFlow™, and poly(ethylene glycol)-based materials. Alternately, the phase change material can be a non-polymeric phase change material such as indium, or other low melting element or alloy.

The working temperature range for most polymeric solid-solid phase change material is from 50° C. to 90° C., which coincides with optimum operating temperature ranges for integrated circuits. For a non-polymeric phase change material such as indium, operation at a temperature greater than 125° C. is also possible.

The homogeneous slurry of a phase change material, a curing agent, and metallic nanoparticles is subsequently poured into a mold or upon another structure such as a substrate. In one embodiment, the mold can be a silicone rubber mold. In another embodiment, a stack of a first substrate 10 and a composite structure 130 of metallic nanoparticles 34 dispersed in a phase change material matrix 42 containing the phase change material and the curing agent (without a second substrate) can be formed as illustrated in FIG. 3A. In yet another embodiment, a stack of a first substrate 10, a composite structure 130 of metallic nanoparticles 34 dispersed in a phase change material matrix 42 containing the phase change material and the curing agent, and a second substrate 20 can be formed as illustrated in FIG. 3A.

In one embodiment, the first substrate 10 and/or the second substrate 20 can independently be a semiconductor chip, a packaging substrate, a printed circuit board (PCB), or a transposer structure as known in semiconductor industry.

Figure 3B:
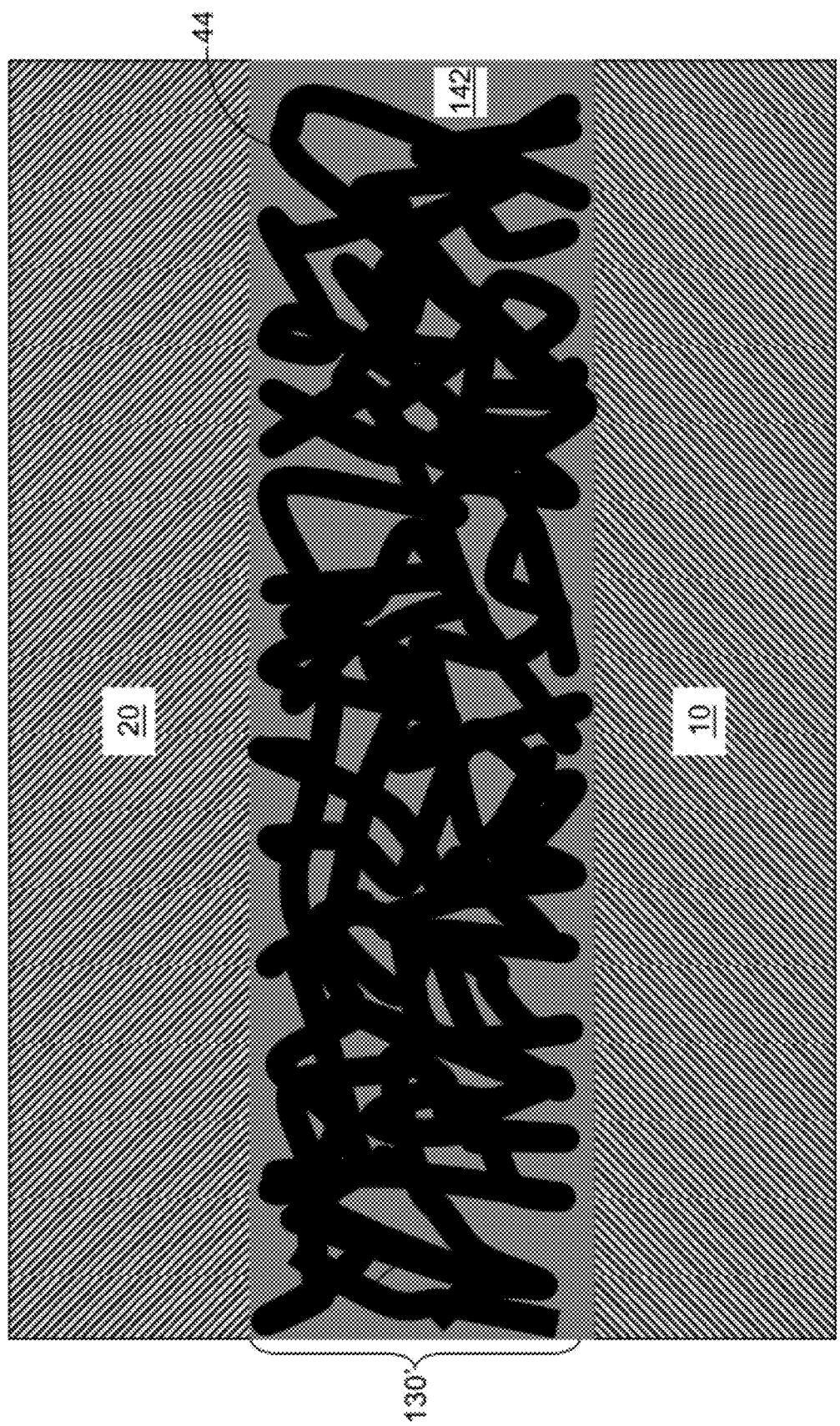
FIG. 3B is a vertical cross-sectional view of the first exemplary structure after inducing interconnection/sintering of the metallic nanoparticles to form a connected percolating thermally conducting network structure embedded within the phase change material matrix according to the second embodiment of the present disclosure.

The composite structure 130 in a mold or in contact with at least one substrate (10, 20) is subsequently cured during an anneal at an elevated temperature employing the same processing conditions as in the first embodiment. A resulting composite structure 130' after the anneal includes a connected percolating thermally conducting network structure 44 as illustrated in FIG. 3B. The connected percolating thermally conducting network structure 44 is embedded within a phase change material matrix 142, which is the remaining portion of the mixture of the phase change material and the curing agent.

In a third embodiment of the present disclosure, the first exemplary structure of FIGS. 1A and 1B can be modified so that phase change material particles are added to the composite structure 30 of FIG. 1A and the composite structure 30' of FIG. 1B. Such structures can be useful for applications for switched power systems as discussed above. High thermal conductivity and high heat capacity can be provided simultaneously in a third exemplary structure of the present disclosure derived by this method.

Specifically, to increase the effective heat capacity, a phase change material in the form of nanoparticles or microparticles is added to the homogeneous slurry of a polymer, the curing agent, and the metallic nanoparticles. Storing and releasing the energy via phase change can act to increase the effective heat capacity of the system. The high thermal conductivity network helps even distribution of the heat to the phase change material.

Figure 4A:
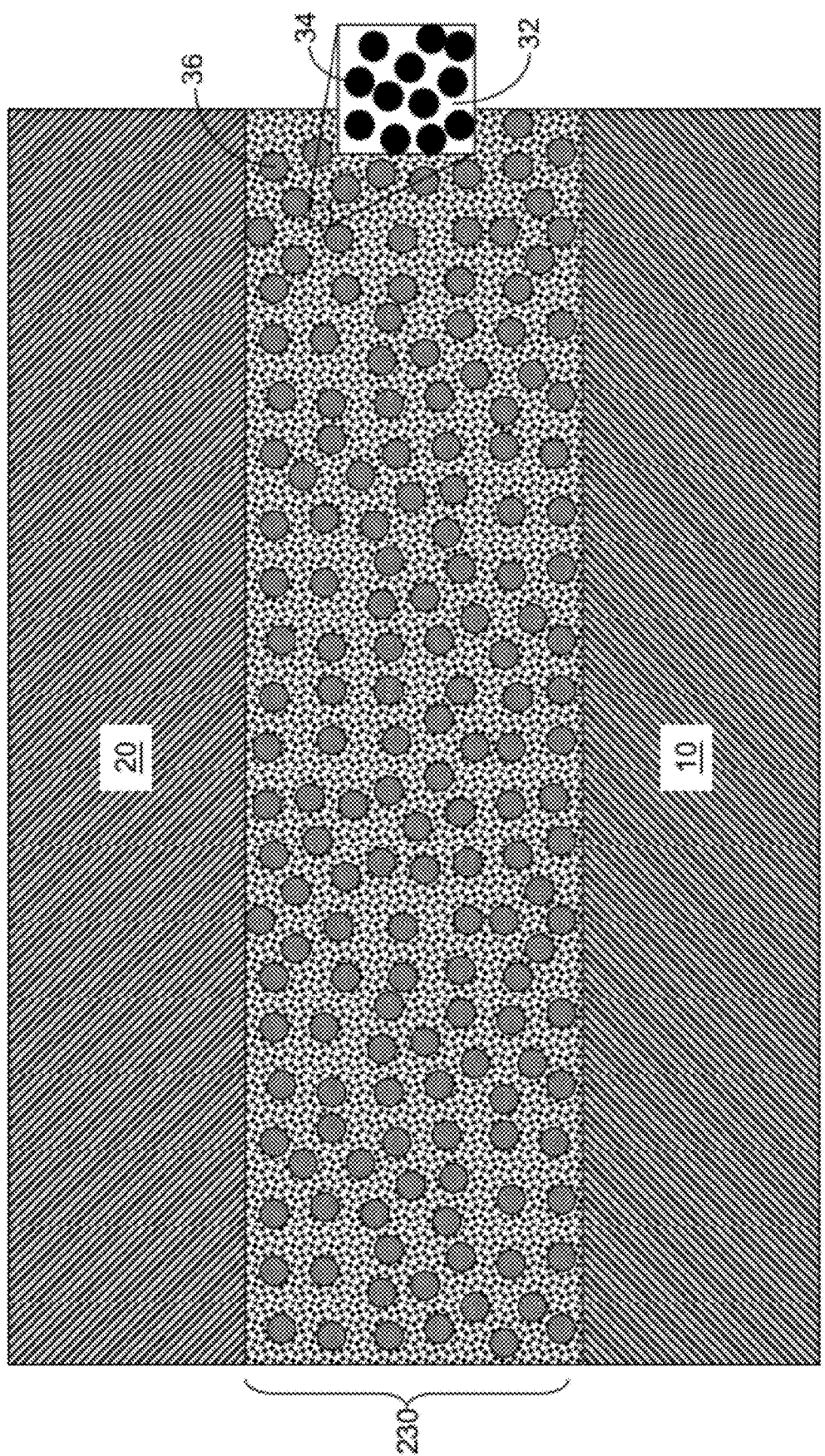
FIG. 4A is a vertical cross-sectional view of a second exemplary structure including a stack of a first substrate, a composite structure of metallic nanoparticles and phase change material particles dispersed in a matrix, and a second substrate according to a third embodiment of the present disclosure.

The homogeneous slurry includes a polymer, a curing agent, metallic nanoparticles, and phase change material particles (in the form of nanoparticles or microparticles) plus any minor additives, adhesion promoter, catalyst/accelerator, cure inhibitor, etc. Phase change material particles can be nanoparticles or microparticles of phase change materials such as phase change salts, lamellar metallo-alkylphosphonates, indium, or a combination thereof. The homogeneous slurry is subsequently poured into a mold or upon another structure such as a substrate. In one embodiment, the mold can be a silicone rubber mold. In another embodiment, a stack of a first substrate 10 and a composite structure 230 of metallic nanoparticles 34 dispersed in a matrix 32 containing a polymer, a curing agent, and phase change material particles 36 (without a second substrate) can be formed as illustrated in FIG. 4A. In yet another embodiment, a stack of a first substrate 10, a composite structure 230 of metallic nanoparticles 34 dispersed in a matrix 32 containing a polymer, a curing agent, and phase change material particles 36, and a second substrate 20 can be formed as illustrated in FIG. 4A.

In one embodiment, the first substrate 10 and/or the second substrate 20 can independently be a semiconductor chip, a packaging substrate, a printed circuit board (PCB), a heat spreader, or a transposer/interposer structure as known in semiconductor industry.

Figure 4B:
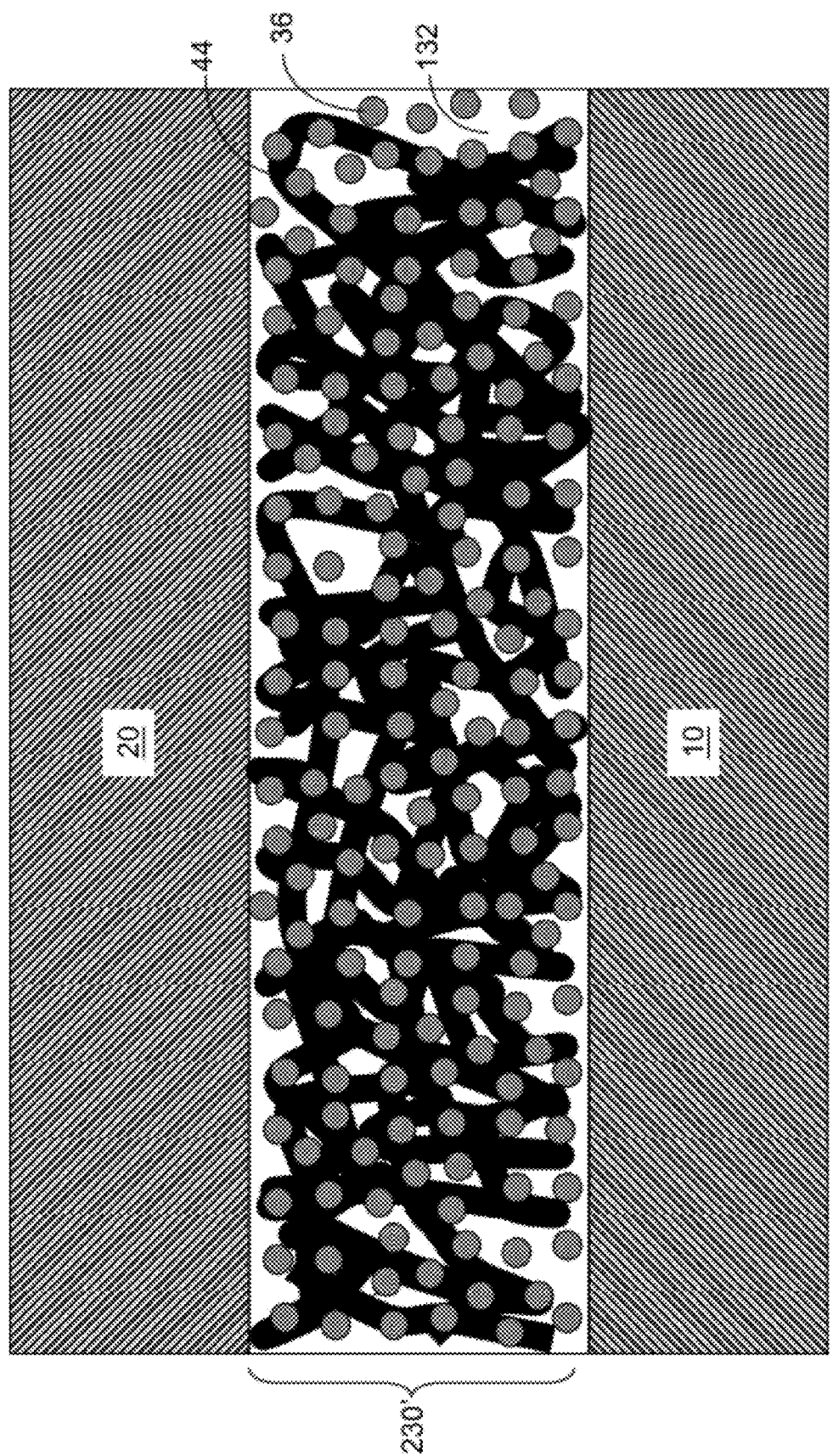
FIG. 4B is a vertical cross-sectional view of the second exemplary structure after inducing interconnection/sintering of the metallic nanoparticles to form a connected percolating thermally conducting network structure embedded within the matrix according to the third embodiment of the present disclosure.

The composite structure 230 in a mold or in contact with at least one substrate (10, 20) is subsequently cured at an elevated temperature employing the same processing conditions as in the first embodiment. A resulting composite structure 230' after the cure includes a connected percolating thermally conducting network structure 44 and phase change material particles 36 as illustrated in FIG. 4B. The connected percolating thermally conducting network structure 44 and the phase change material particles 36 are embedded within a polymeric matrix 132, which is the remaining portion of the mixture of the polymer and the curing agent.

In one embodiment of the present disclosure, thermal conductivity, high heat capacity materials for large scale thermal storage applications are provided as a composite structure such as the composite structure 130' in FIG. 3B or the composite structure 230' in FIG. 4B. Such composite structures (130', 230') can be employed as thermal management materials for thermal energy storage. Specifically, the combination of the connected percolating thermally conducting network structure 44 and the phase change material in the composite structure (130', 230'), whether provided as a phase change material matrix 142 of FIG. 3B or as phase change material particles 36 of FIG. 4B, can function as a thermal energy storage conductive network (TESCoNet).

Figure 5A:
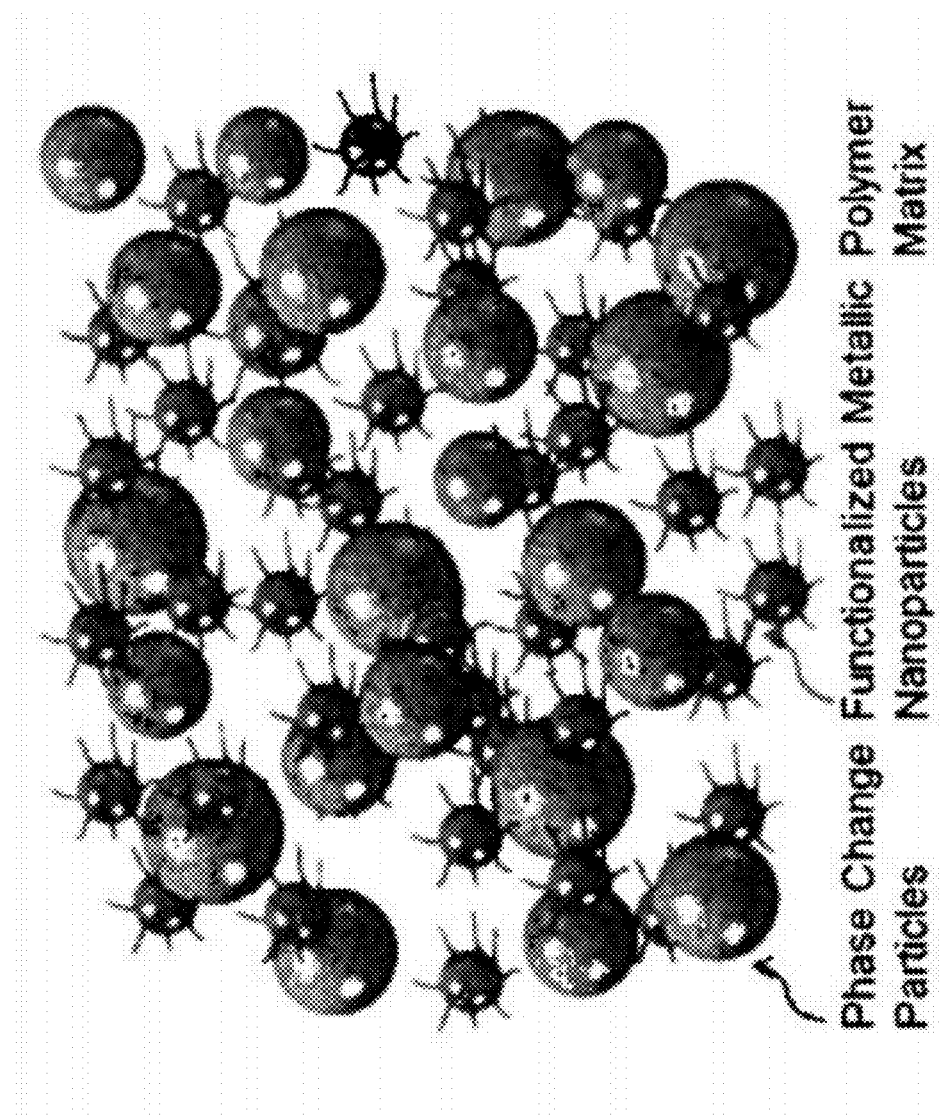
FIG. 5A is a schematic view of a composite structure of the second exemplary structure after functionalizing metallic nanoparticles according to the third embodiment of the present disclosure.
Figure 5B:
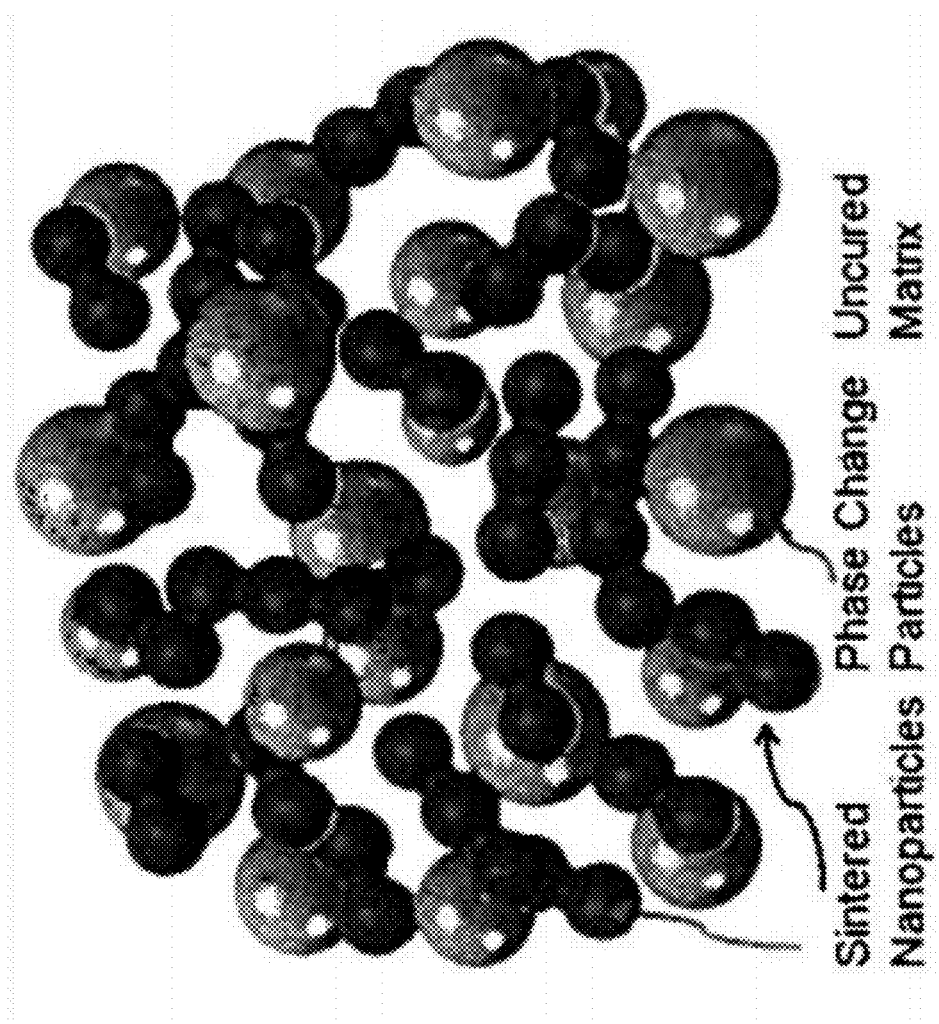
FIG. 5B is a schematic view of the composite structure of the second exemplary structure after removal of a functionalizing coating according to the third embodiment of the present disclosure.
Figure 5C:
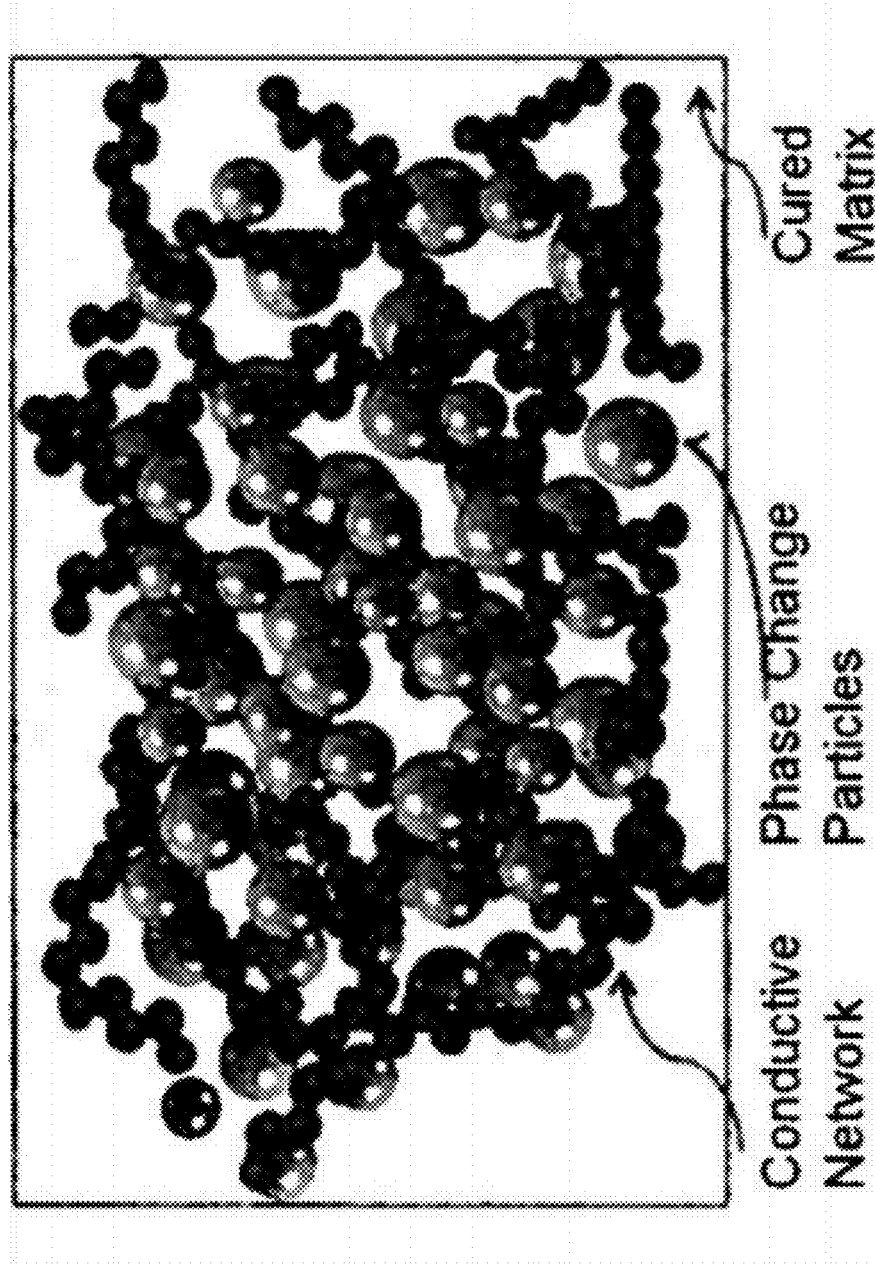
FIG. 5C is a schematic view of the composite structure of the second exemplary structure after formation of a connected percolating thermally conducting network structure according to the third embodiment of the present disclosure.

The various nanoscale structures of the third exemplary structure of FIGS. 4A and 4B are described at various stages of the manufacturing process in FIGS. 5A, 5B, and 5C. FIGS. 5A-5C show key features and the synergy between material synthesis and its properties for the high thermal conductivity, high heat capacity, thermal energy storage conductive network material according to an embodiment of the present disclosure.

Referring to FIG. 5A, the material synthesis is a versatile approach that allows an organic/metal nanoparticle/phase-change slurry with large metal nanoparticle content to be cast into any shape for building thermal energy storage applications or to fill the gap between heat source and heat sink surfaces (for TIMs). The nanoparticles are functionalized to allow uniform dispersion. For example, the high κ nanoparticles can be functionalized by coating with molecular layers. For example, the high κ nanoparticles can be functionalized with a hydrophobic coating that promotes wetting and dispersion of the metallic nanoparticles within a matrix. Exemplary hydrophobic materials that can be used to coat the high κ nanoparticles include, but are not limited to, methyltrichlorosilane, triphenylchlorosilane, and Pluronic 123. The functionalized high κ nanoparticles are subsequently mixed with PCM particles to form a high solids volume fraction slurry able to flow and fill the roughness of two mating surfaces, e.g., the top surface of the first substrate 10 and the bottom surface of the second substrate 20 in FIG. 4A, or be casted in any shapes for thermal storage applications.

Referring to FIG. 5B, after removal of the functional groups the nanoparticles transform into a continuous high thermal conductivity network (HTCN) through a thermally induced agglomeration and sintering process. The molecular coating is removed by low temperature processing, and the metallic nanoparticles start to agglomerate and sinter into high thermal conductivity networks (HTCN), which is the same as at least one percolating thermally conducting network structure 44 illustrated in FIG. 4B.

Referring to FIG. 5C, in the final processing step, the matrix material is fully cured providing mechanical stability of the composite. The HTCN is situated in proximity with the PCM matrix/filler particles and enable efficient heat transfer between the surroundings and the inside of the nanocomposite, i.e., the composite structure including nanoscale features. The high K network at the end of the process has PCM particles distributed in its vicinity for efficient heat transfer. The cured polymer matrix provides compliant mechanical support and accommodates volume changes during phase change.

A TESCoNet employs several advanced features enabled by nanotechnology. A first feature is the controlled coating of the nanoparticles to promote wetting and dispersion of the nanoparticles (both metallic and PCM) in the matrix. The coating on the metal particles can be removed at relatively low temperatures before sintering and matrix curing occurs. For example, the coating on the metal particles can be removed at a temperature below 150° C. A second feature is reduced melting temperature. Therefore, sintering temperatures of the metallic nanoparticles is reduced due to small size to enable low temperature sintering, e.g., below 275° C. or below 150° C. A third feature is the formation of an interconnected, high thermal conductivity network inside the matrix, i.e., a connected percolating thermally conducting network structure embedded within a matrix at low volume fractions. The connected percolating metallic network includes interconnected thermally conducting pathways for conduction of heat or electricity. The entirety of the connected percolating metallic network is embedded within the matrix.

Because of the presence of high thermal conductivity metal nanoparticles, such as silver and copper, the resulting metal network will have a thermal conductivity equal to a significant fraction of the corresponding bulk metal, such as bulk silver and bulk copper. In one embodiment, this fraction can be greater than 5%. In another embodiment, this fraction can be greater than 10%. In yet another embodiment, this fraction can be greater than 20%. This metal network structure in turn results in the thermal conductivity of the composite structure according to embodiments of the present disclosure being much higher than the thermal conductivity of current state of the art for polymer composites with microparticles, which do not include any nanoscale interconnected structure. In one embodiment, by selecting a large enough volume fraction, e.g., from 5% in volume fraction to 50% in volume fraction, a metal continuum phase can be formed as a three dimensional structure after sintering.

Second, a high heat capacity of the composite can be provided for by incorporating phase change materials Third, in the slurry, the metallic nanoparticles and phase change particles will be molecularly functionalized with hydrophobic termination and dispersed in an engineered adhesive polymer precursor. The functionalization will prevent particle clustering, even at very high volume fraction, and limit viscosity increases thus allowing the slurry to flow to allow mixing and casting as needed.

In conventional microparticle composites, the composite thermal conductivity is low because of the large number of particle/matrix interfaces and interparticle poor connectivity, which are serious limitations in current microparticle based technologies for composites. According to an embodiment of the present disclosure, these difficulties are obviated by using thermal and chemical means to strip the functionalizing monolayers from the nanoparticles and via low temperature sintering create a highly interconnected metal continuum phase to provide 3D high thermal conductivity paths across the composite. Relatively low volume fraction of the metal in nanocomposites of this embodiment can ensure a highly interconnected metallic network. Additionally, by selecting nanoparticle size distributions (e.g., broad or bi/tri-modal) the volume fraction can be increased for further increase in conductivity while optimizing viscosity.

EXAMPLES

A high thermal conductivity nanocomposite was obtained at relatively low filler loading by controllably producing the highly connected, metallic network in an epoxy matrix. Pure epoxies have low κ of about 0.18 W/mK.

Following the steps of FIGS. 5A-5C, a high thermal conductivity network (HTCN) was formed after dispersion and controlled sintering of silver nanoparticles. Thermal conductivity measurements showed a thermal conductivity of about 29 W/mK, for 20 nm silver nanoparticles based composites with a volume fraction of 30%. Even at lower nanoparticle volume fractions (10%), the measured thermal conductivities in the nanocomposites was about 7 W/mK. which surpasses the thermal conductivity reported for epoxy microparticle composites as known in the art.

Moreover, a fundamental difference between the microparticle and the nanoparticle based composites has been observed. At the same volume fractions, silver-epoxy based composited obtained with 2~4 μm diameter silver particles and processed under similar conditions as their nano-counterparts displayed thermal conductivities that are orders of magnitude lower, which is attributed to lack of formation of HTCN from the microparticles. Thus, nanoparticles display propensity for formation of a connected percolating thermally conducting network structure embedded within a matrix such that the connected percolating metallic network includes interconnected thermally conducting pathways.

Effective media based heat conduction models and microscopy studies confirmed the experimental observation.

Silver nanoparticles with a diameter of 20 nm and 80 nm and coated with polyvinyl pyrrolidone (PVP) to prevent oxidation were purchased from Nanostructured and Amorphous Materials, Inc.™ Comparative experiments were performed with silver microparticles with a diameter of 1.8 microns and 4.2 microns, which were obtained from Technic Inc.™ The epoxy and the curing agent used in this study was EPL 112 obtained from Master Bond, USA™.

The nanocomposite was constructed according to the following steps. First the low viscosity epoxy resin having viscosity of about 0.1 Pa·s and curing agent were mixed using a high speed shear mixer (IEC Centra CL2, USA) for 10 min at 2000 rpm. The curing agent was Masterbond EPL 112. Next, the silver nanoparticles (0~30 volume %), were added to the mixture and sonicated using an ultrathin probe sonicator (550 Sonic, Fisher Scientific, USA) to obtain a homogeneous slurry. To avoid premature curing, the nanocomposite mixture was held at room temperature during the sonication process. Next, the mixture was degassed in a vacuum chamber to remove air bubbles. Finally the mixture was poured into silicon rubber molds and cured in an oven (type 6000, Thermolyne Sybron, USA) at 150° C. for one hour in argon gas atmosphere. Before the thermal conductivity experimental runs, the samples were polished to ensure two parallel surfaces for mounting in the apparatus.

To facilitate sintering of silver nanoparticles, the PVP coating was removed by a heat treatment process, which did not simultaneously cure the composite and allowed the particles to aggregate. The processing temperature was fine tuned using thermogravimetric analysis (TGA).

Figure 6:
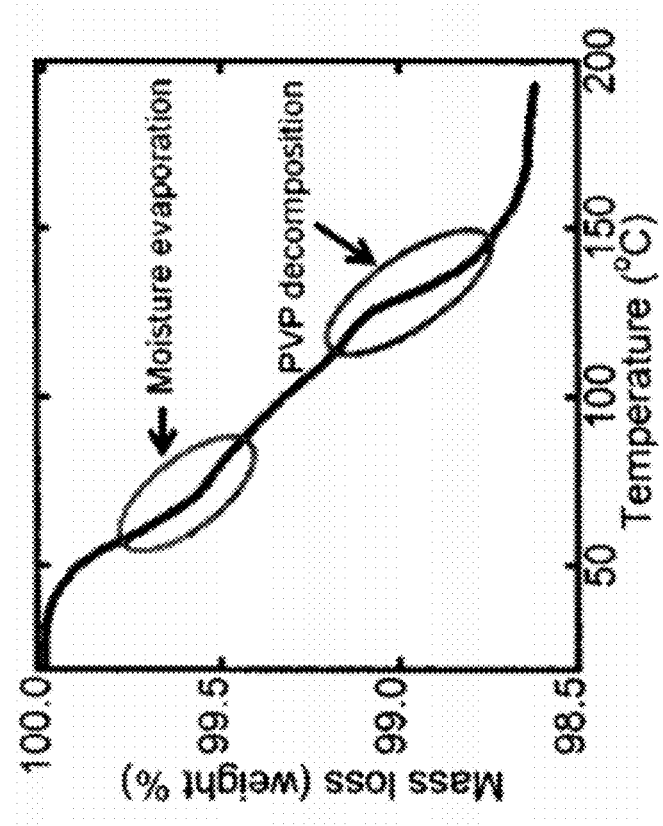
FIG. 6 is a thermogravimetric analysis curve for the silver nanoparticles showing the PVP decomposition temperature range.

FIG. 6 is a thermogravimetric analysis curve for the silver nanoparticles showing the PVP decomposition temperature range for coated silver nanoparticles.

Thermal annealing of the nanocomposite slurry was then performed at 150° C. for one hour to cure the polymer. Preliminary morphological studies using TEM and SEM were performed on the cured nanocomposite formed from the slurry including 20 volume % of 20 nm silver nanoparticles in order to investigate the network formation. FIG. 2A is the SEM image before removal of the epoxy, and FIG. 2B is a TEM image before removal of the epoxy. To get better images from SEM, an oxygen plasma etching step was first employed to selectively remove the epoxy from the sample surface. A 3D metallic network was revealed as presented in FIG. 2C.

Figure 7:
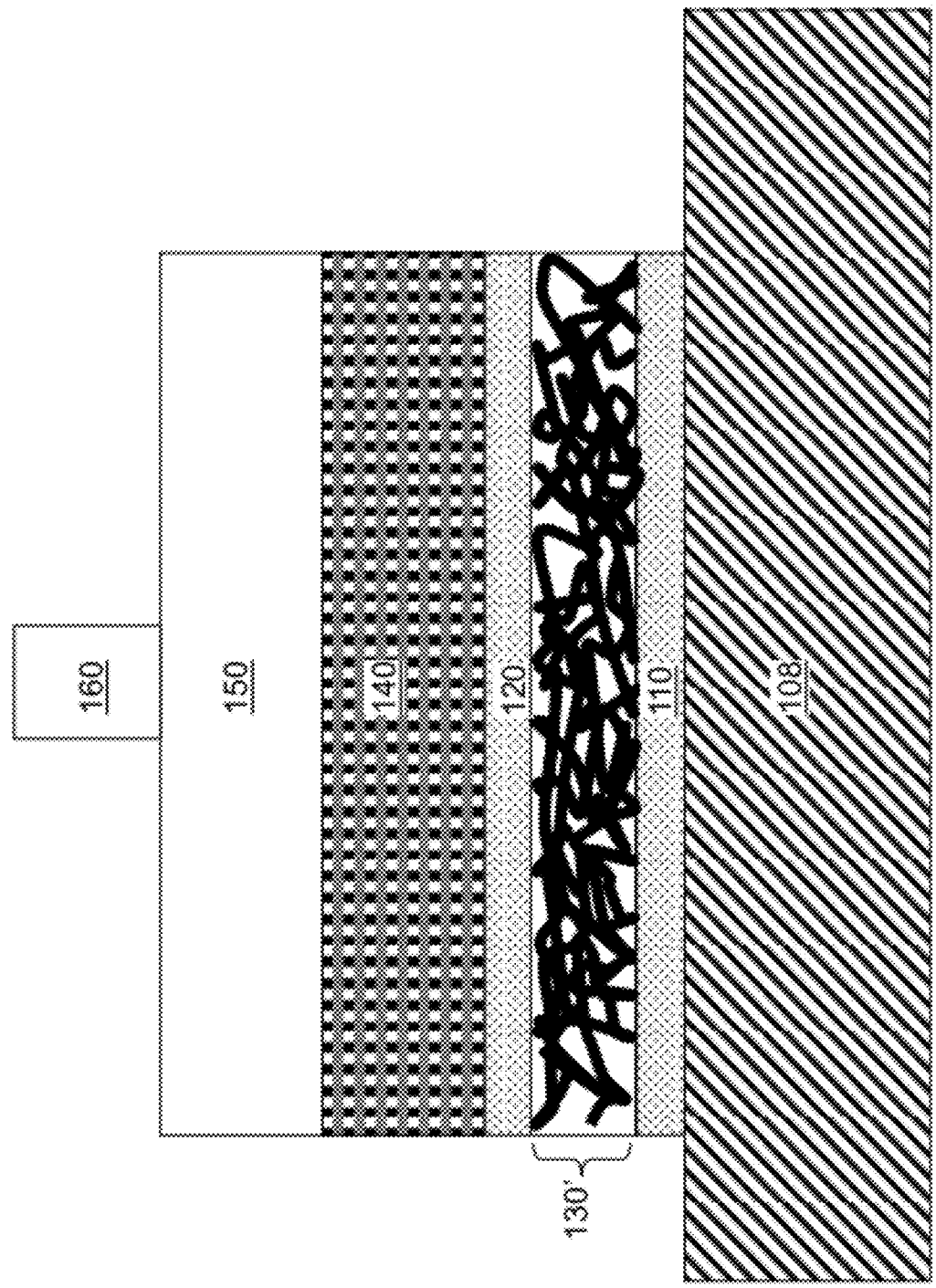
FIG. 7 is a schematic vertical cross-sectional view of a test structure according to an embodiment of the present disclosure.

The thermal conductivity of the nanocomposites was measured using a steady state one dimensional heat conduction method. The experimental setup includes an electrical heater, a heat sink as well as two thermocouples to measure the thermal gradient as illustrated in FIG. 7. In FIG. 7, the sample is shown as a composite structure 130', which has the structure illustrated in FIG. 1B. The sample was mounted to a heat sink 108 through a first indium layer 110. Subsequently, an assembly of a heater 140 and an insulator layer 150 was mounted to the top surface of the composite structure 130' through a second indium layer 120. To minimize interface thermal resistances, the fine diameter electrically insulated thermocouples (not shown) were embedded into soft indium layers (110, 120). Pressure was applied using a screw mechanism 160 that was thermally insulated from the sample by a thick Teflon block. The heat losses in the experimental setup were calibrated using glass samples of known thermal conductivity. The pure epoxy thermal conductivity measured with this setup matched the value known in the art.

Figure 8A:
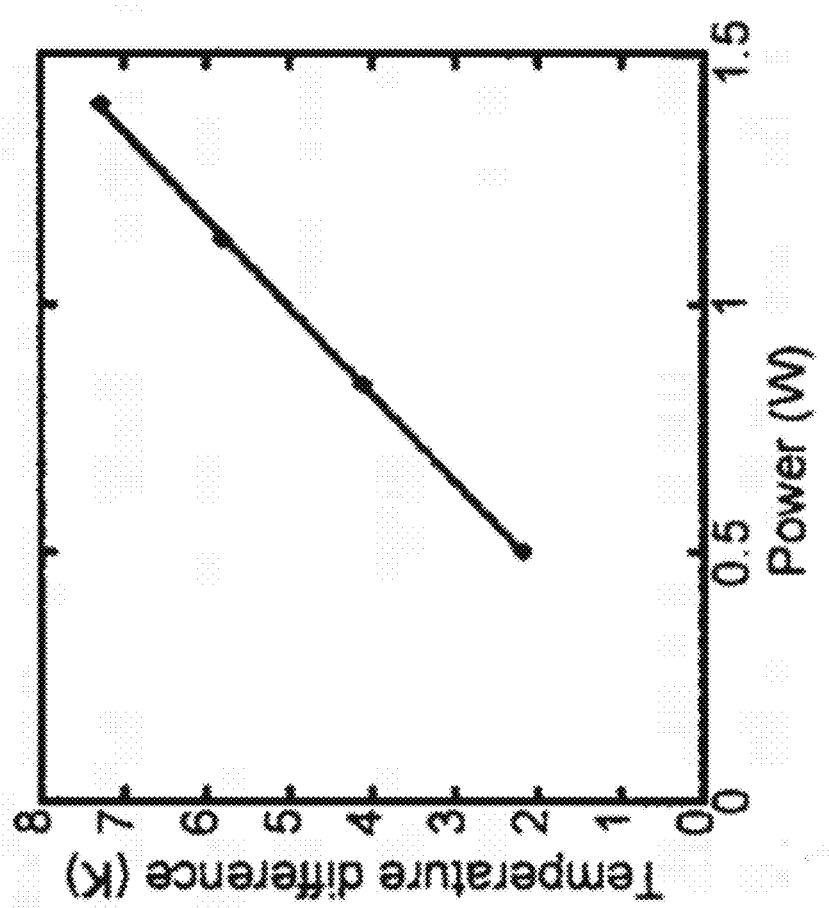
FIG. 8A is a plot showing exemplary signals (dots) and a linear fit (a line) to determine the experimental sample thermal resistance.
Figure 8B:
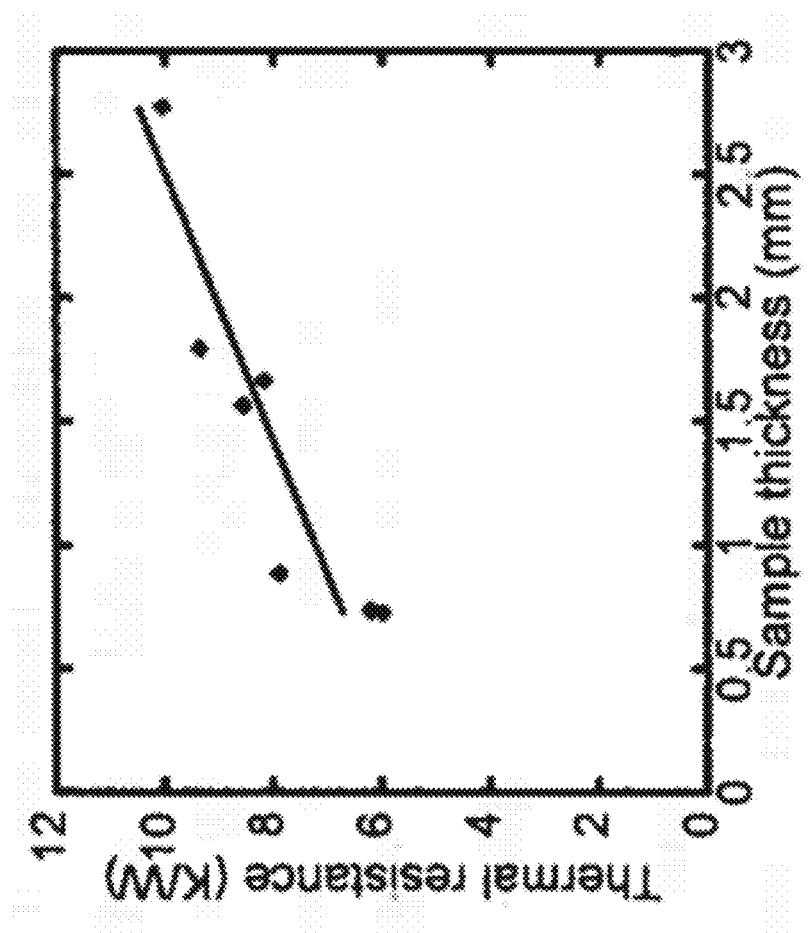
FIG. 8B is a plot of sample resistance as a function of thickness, which allows determination of the intrinsic resistance/thermal conductivity from the slope and the contact thermal resistance from the vertical axis intersect.

First, the experimental thermal resistance was obtained from the slope of the temperature difference across the sample as a function of heater power as illustrated in FIG. 8A. The plot of sample resistance as a function of thickness allowed determination of the intrinsic resistance (from slope) and the contact thermal resistance (vertical axis intersect-typically about 5 K/W). Next, the calibrated heat loss contribution was accounted for by using a parallel thermal resistance network model. To find the intrinsic thermal conductivity, the interface thermal resistance was subtracted from the overall conduction resistance. The interface thermal resistance was determined by testing samples with different thicknesses, then extrapolating the thermal resistance vs. thickness plot to zero thickness as illustrated in FIG. 8B. The setup was calibrated for heat losses using glass samples and yields measured thermal conductivity for pure epoxy samples that match reported values.

The experimental thermal conductivity results for the composites were compared with predictions based on two effective media models. The Maxwell-Eucken model was used to evaluate the thermal conductivity for randomly distributed homogeneous spheres in a continuous media:

$$k = k_m \cdot \left[ \frac{1 + 2\phi\left(\frac{\lambda - 1}{\lambda + 2}\right)}{1 - \phi\left(\frac{\lambda - 1}{\lambda + 2}\right)} \right], \tag{1}$$

where k and $k_m$ denote the thermal conductivities of the composite and the matrix, respectively, and $\lambda$ is the thermal conductivity ratio between the filler and the matrix, and $\phi$ is the volume fraction of the filler in the matrix. This model is shown to best describe the experimental results obtained for the microcomposite as shown in FIG. 7.

The theoretical predictions have been explored of a Maxwell-Garnett effective medium for the thermal conductivities of nanocomposites with low loadings of randomly oriented nanorods with average length of l and diameter of d:

$$k = k_m \cdot \left[ \frac{3 + \phi(\beta_x + \beta_z)}{3 - \phi\beta_x} \right] \tag{2}$$

where, $$\beta_x = \frac{2(k_d - k_m)}{k_d + k_m} \text{ and } \beta_z = \frac{k_l}{k_m} - 1, \tag{3}$$

and $k_d$ and $k_l$ are, respectively, the thermal conductivities across the width and along the length of the nanorods expressed as:

$$k_d = \frac{k_{Ag}}{1 + \frac{2 a_K k_{Ag}}{d k_m}}, \tag{4}$$

and $$k_l = \frac{k_{Ag}}{1 + \frac{2 a_K k_{Ag}}{l k_m}}. \tag{5}$$

In Eqs. 4 & 5, $k_{Ag}$ is the intrinsic thermal conductivity of the rods, and $a_K$ is known as Kapitza radius:

$$a_K = r k_m, \tag{6}$$

where r is the specific interface thermal boundary resistance between the nanostructures and the matrix.

The microparticle composites and the nanoparticle composite exhibited fundamentally different heat transfer mechanisms, with the microcomposite showing orders of magnitude lower thermal conductivities. While the Maxwell-Eucken model describes well the low thermal conductivity of the microcomposite, the Maxwell-Garnett model describes well the high thermal conductivity of the nanocomposite.

Figure 9A:
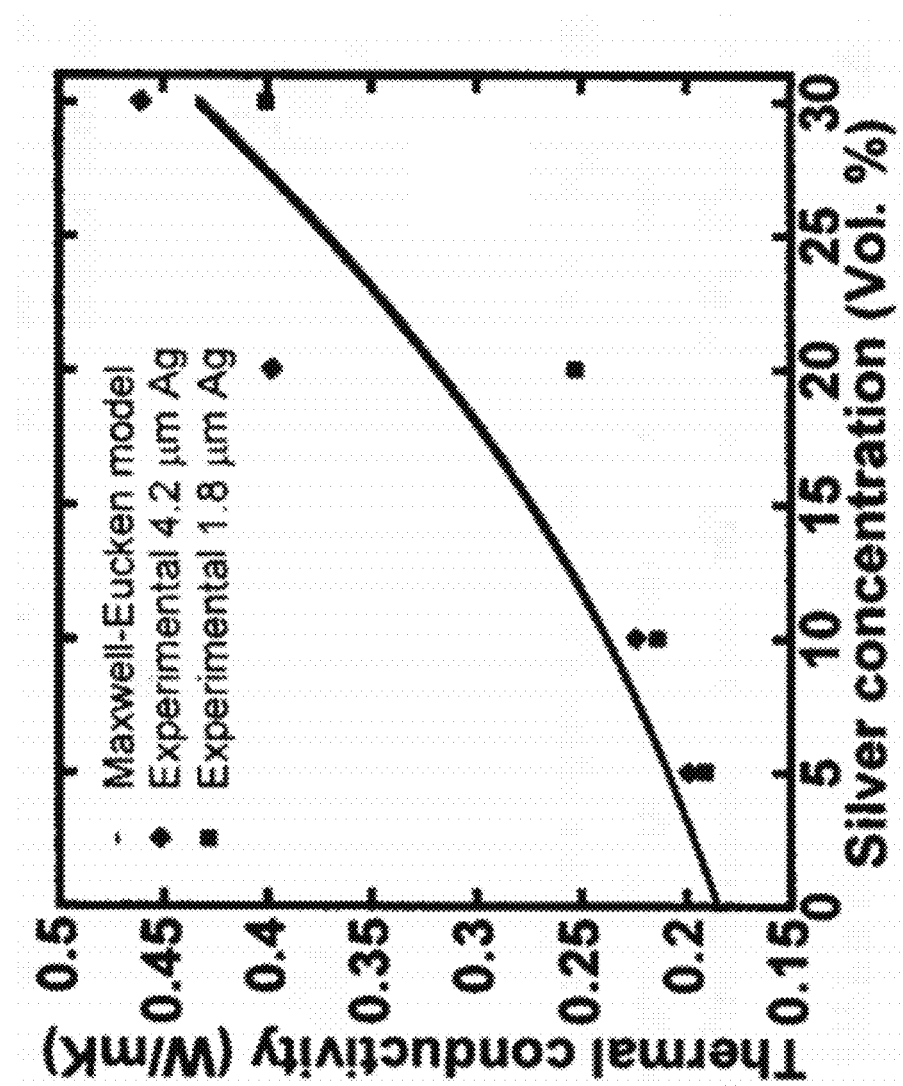
FIG. 9A is a plot showing measured and predicted thermal conductivity of epoxy composites filled with microparticles.
Figure 9B:
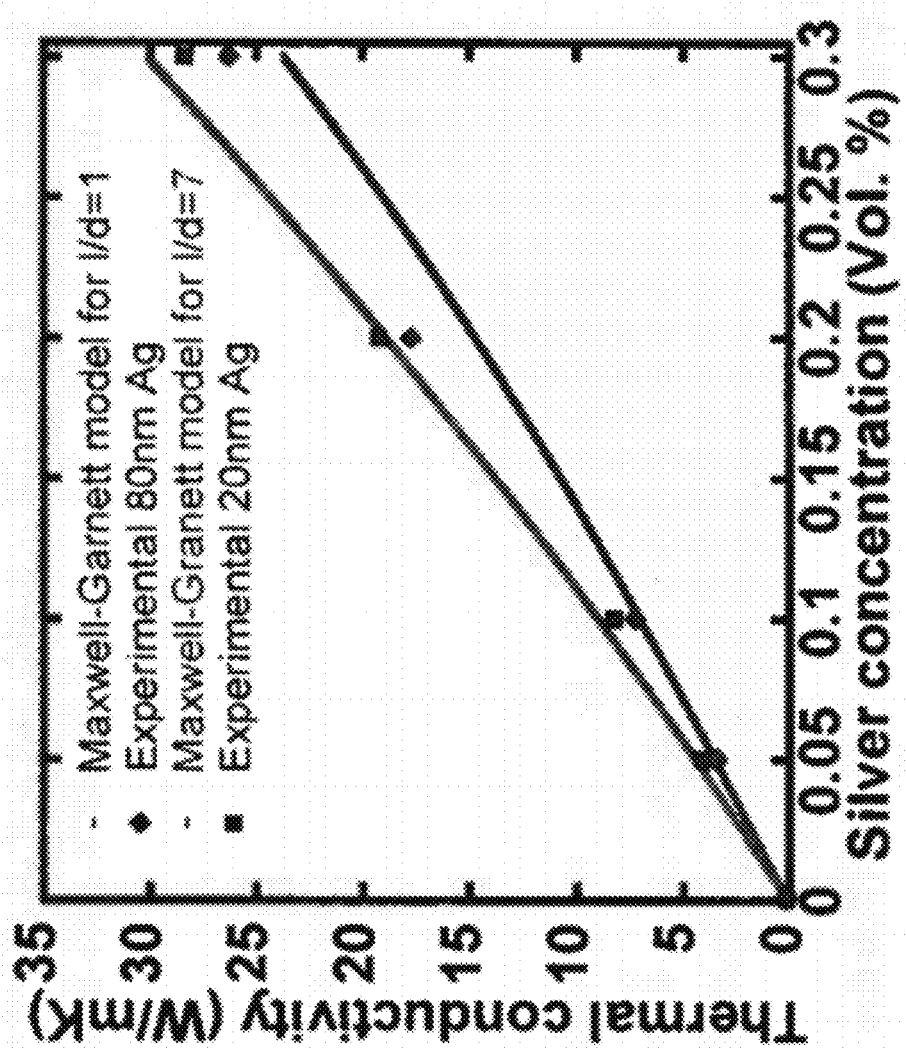
FIG. 9B is a plot showing measured and predicted thermal conductivity of epoxy composites filled with nanoparticles.

FIGS. 9A and 9B show a comparison between the thermal conductivity predicted by the effective media models versus the volume fractions of the silver particles for the microcomposite and the nanocomposite respectively. FIG. 9A shows measured and predicted thermal conductivity of epoxy composites filled with microparticles as a function of particle volume fraction in low loading silver particles. FIG. 9B shows measured and predicted conductivity of epoxy composites filled with nanoparticles (right) as a function of particle volume fraction in low loading silver particles. The solid lines present Maxwell-Eucken model predictions for microcomposites and Maxwell-Garnett model predictions for nanocomposites, respectively.

Dots in FIGS. 9A and 9B are the experimentally measured thermal conductivities of the composites. For both models, an assumption had been made that the interface thermal boundary resistance was zero and the thermal conductivity values for silver and epoxy were $k_{Ag}$=429 W/mK and $k_m$=0.185 W/mK, respectively. The Maxwell-Garnett model predictions depend on the parameter p=l/d which was obtained through data fitting p=7 for the 20 nm silver composite and p=1 for 80 nm silver composite. These numbers can be interpreted as the average number of silver particles connected to each other in the samples.

There were striking differences between the nanocomposites and the microcomposites. The thermal conductivity increases from 0.185±0.02 W/mK for the pure epoxy to 28.41±1.25 and 26.23±2.11 for the 20 nm, and 80 nm nanocomposites, respectively, at $\phi$=30%. However for the microcomposite the thermal conductivity went up only to 0.46±0.12 and 0.40±0.07 (W/mK) for the 4.6 micron and 1.8 micron micro silver, respectively. In general, the thermal conductivity of silver nanocomposite was at least one order of magnitude higher than that of the polymer composite filled with the same content of silver micro particles. The out-layers in the thermal conductivity plots were likely due to voids inside the samples.

The modeling trends confirmed the fundamental difference between the heat conduction mechanisms in the micro and nanoparticle based composites. The rod type model indicated the particle coalesce and increased the thermal path as confirmed by the microscopy investigation. However, the microparticles cannot sinter and remain isolated.

This work demonstrates that high thermal conductivity nanocomposites starting from dispersed nanoparticles in a polymer matrix are achievable. A new mechanism for thermal conductivity enhancement has been identified, which is the low temperature sintering of metal nanoparticles into high thermal conductivity networks. This mechanism could pave the way for novel high thermal conductivity high heat capacity materials for thermal energy storage based on metal-polymer-phase change composites. Also, electrically non-conducting nanoparticles can in principle be used to make thermally conducting and electrically insulating composites.

This high thermal conductivity thermal interface material strategy presented here allows for the formation of an interconnected, spanning, high thermal conductivity network within the matrix of a polymeric material using nanoparticles, and as a result can yield approximately two orders of magnitude higher thermal conductivities than the non-network microparticle counterpart, as well as factorial enhancements vs. the state of the art polymer composites.

Metallic thermal interface materials such as Indium and liquid metal possess high thermal conductivity but are expensive and require complex processes to implement. Compared to other thermal interface materials, the novel polymeric TIM design disclosed here shows significantly higher thermal conductivity at lower filler loadings. Further, the method for providing a thermal interface material disclosed herein can be used in the field for packaging of wide array of electronic and photonic devices that require efficient heat dissipation and must be interfaced with a thermal management system. Such applications include, but are not limited to, electronic packages, or other applications that require an efficient conductive extraction of heat from a heat source to a heat sink. The thermal interface material of the present disclosure can provide optimum performance and reliability of these devices due to its high thermal conductance.

While the disclosure has been described in terms of specific embodiments, it is evident in view of the foregoing description that numerous alternatives, modifications and variations will be apparent to those skilled in the art. Each of the various embodiments of the present disclosure can be implemented alone, or in combination with any other embodiments of the present disclosure unless expressly disclosed otherwise or otherwise impossible as would be known to one of ordinary skill in the art. Accordingly, the disclosure is intended to encompass all such alternatives, modifications and variations which fall within the scope and spirit of the disclosure and the following claims.

What is claimed is:

1. A composite structure comprising a matrix and a connected percolating thermally conducting network structure embedded within said matrix, said connected percolating network comprising interconnected nanoparticles that are in contact among one another throughout an entirety of the composite structure.

2. The composite structure of claim 1, wherein said nanoparticles have a dimension in a range from 5 nm to 500 nm.

3. The composite structure of claim 1, wherein said nanoparticles comprise doped semiconductor nanoparticles, metal carbide nanoparticles, oxide nanoparticles or nitride nanoparticles.

4. The composite structure of claim 1, wherein said matrix comprises a polymer material.

5. The composite structure of claim 4, wherein said polymer material is selected from an epoxy, modified epoxy, silicone, and rubber.

6. The composite structure of claim 1, further comprising phase change material particles dispersed within said matrix.

7. The composite structure of claim 6, wherein said phase change material particles comprise at least one of phase change salts, lamellar metallo-alkylphosphonates, indium nanoparticles, and low melt element or alloy.

8. The composite structure of claim 1, wherein said matrix comprises a phase change material.

9. The composite structure of claim 8, wherein said phase change material comprises at least one of an organic phase change material, an inorganic phase change material, and a eutectic of at least two phase change materials.

10. The composite structure of claim 1, wherein said connected percolating thermally conducting network structure is a metallic nanoparticle network having a volume fraction from 0.1% to 50% within said composite structure.

11. The composite structure of claim 10, wherein a volume fraction of said metallic nanoparticle network within said composite structure is from 0.1% and 20%, and said composite structure has a thermal conductivity greater than 1.0 W/mK.

12. The composite structure of claim 10, wherein said metallic nanoparticle network comprises silver nanoparticles, copper nanoparticles or aluminum nanoparticles.

13. A semiconductor structure comprising:
a first substrate;
a second substrate; and
a composite structure located between said first substrate and said second substrate, wherein said composite structure comprises a matrix and a connected percolating thermally conducting network structure embedded within said matrix, said connected percolating network comprising interconnected nanoparticles that are in contact among one another throughout an entirety of said composite structure so as to provide interconnected thermally conducting pathways from said first substrate to said second substrate.

14. The semiconductor structure of claim 13, wherein each of said first substrate and said second substrate comprises a semiconductor chip, a packaging substrate, a printed circuit board (PCB), or a transposer structure.

15. The semiconductor structure of claim 13, wherein said nanoparticles comprise metallic nanoparticles selected from silver nanoparticles, copper nanoparticles and aluminum nanoparticles.

16. The semiconductor structure of claim 13, wherein said nanoparticles comprise non-metallic nanoparticles selected from doped semiconductor nanoparticles, metal carbide nanoparticles, oxide nanoparticles and nitride nanoparticles.

17. The semiconductor structure of claim 13, wherein said matrix further comprises a phase change material.

18. The semiconductor structure of claim 13, wherein said matrix comprises a polymer material.

19. The semiconductor structure of claim 18, wherein said polymer material is selected from an epoxy, modified epoxy, silicone, and rubber.

* * * * *